United States Patent
Voglewede (10) Patent No.: US 12,103,086 B2
(45) Date of Patent: Oct. 1, 2024

(54) EARTH-BORING DRILL BIT FORMED BY ADDITIVE MANUFACTURING

(71) Applicant: Halliburton Energy Services, Inc., Houston, TX (US)

(72) Inventor: Daniel Brendan Voglewede, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 231 days.

(21) Appl. No.: 17/615,627

(22) PCT Filed: Aug. 8, 2019

(86) PCT No.: PCT/US2019/045711
§ 371 (c)(1),
(2) Date: Dec. 1, 2021

(87) PCT Pub. No.: WO2021/025700
PCT Pub. Date: Feb. 11, 2021

(65) Prior Publication Data
US 2022/0235613 A1    Jul. 28, 2022

(51) Int. Cl.
*B33Y 10/00* (2015.01)
*B22F 7/08* (2006.01)
(Continued)

(52) U.S. Cl.
CPC ............. *B22F 7/08* (2013.01); *B22F 10/18* (2021.01); *B22F 10/28* (2021.01); *B33Y 10/00* (2014.12);
(Continued)

(58) Field of Classification Search
CPC .......... E21B 10/54; E21B 10/42; E21B 10/55; B33Y 80/00; B22F 2005/001
See application file for complete search history.

(56) References Cited

U.S. PATENT DOCUMENTS 2,885,524 A * 5/1959 Eisler ................. H01C 17/23
338/195
5,589,011 A * 12/1996 Gonsalves ............. B22F 1/07
148/334

(Continued)

FOREIGN PATENT DOCUMENTS

WO    2012-071449 A2    5/2012

OTHER PUBLICATIONS

International Search Report for PCT Patent Application No. PCT/US2019/045711, mailed May 7, 2020; 5 pages.
(Continued)

*Primary Examiner* — Blake Michener
(74) *Attorney, Agent, or Firm* — Michael Jenney; C. Tumey Law Group PLLC (57) ABSTRACT

The present disclosure relates to an earth-boring drill bit including a shank, an internal region formed from at least a first alloy using additive manufacturing and secured to the shank, and an exterior region formed from at least a second alloy using additive manufacturing and secured to the internal region using additive manufacturing. The first alloy and the second alloy have a different modulus of elasticity, yield strength, resilience, ductility, hardness, fracture toughness, wear resistance, corrosion resistance, or erosion resistance. The disclosure further includes a method of manufacturing such an earth-boring drill by depositing a plurality of layers according to a drill bit specification using additive manufacturing.

18 Claims, 4 Drawing Sheets

(51) Int. Cl.
  *B22F 10/18* (2021.01)
  *B22F 10/28* (2021.01)
  *B33Y 70/00* (2020.01)
  *B33Y 80/00* (2015.01)
  *C22C 38/00* (2006.01)
  *E21B 10/54* (2006.01)
  *B22F 10/25* (2021.01)

(52) U.S. Cl.
  CPC .............. *B33Y 70/00* (2014.12); *B33Y 80/00* (2014.12); *E21B 10/54* (2013.01); *B22F 10/25* (2021.01); *C22C 38/00* (2013.01)

(56) References Cited

U.S. PATENT DOCUMENTS

| | | | |
|---|---|---|---|
| 6,209,420 B1 | 4/2001 | Butcher et al. | |
| 6,655,481 B2 | 12/2003 | Findley et al. | |
| 8,006,781 B2 * | 8/2011 | Teodorescu | E21B 12/02 175/42 |
| 8,950,518 B2 * | 2/2015 | Lockwood | C22C 29/06 264/108 |
| 12,018,531 B2 * | 6/2024 | Voglewede | E21B 10/42 |
| 2007/0102198 A1 | 5/2007 | Oxford et al. | |
| 2008/0289880 A1 * | 11/2008 | Majagi | C22C 26/00 175/335 |
| 2010/0193255 A1 | 8/2010 | Stevens et al. | |
| 2010/0212961 A1 * | 8/2010 | Teodorescu | E21B 10/42 175/39 |
| 2011/0079446 A1 * | 4/2011 | Oxford | E21B 10/42 175/425 |
| 2013/0068525 A1 * | 3/2013 | DiGiovanni | E21B 47/06 29/592.1 |
| 2013/0333950 A1 | 12/2013 | Atkins et al. | |
| 2016/0319605 A1 | 11/2016 | Hough et al. | |
| 2017/0107764 A1 | 4/2017 | Cook et al. | |
| 2018/0058148 A1 | 3/2018 | Zhang et al. | |
| 2018/0320449 A1 | 11/2018 | Zhang et al. | |
| 2019/0242238 A1 * | 8/2019 | Yao | E21B 47/013 |
| 2020/0308954 A1 * | 10/2020 | Hird | E21B 47/01 |
| 2021/0032936 A1 * | 2/2021 | Zhan | E21B 12/02 |
| 2022/0178246 A1 * | 6/2022 | Hird | E21B 10/32 |
| 2022/0228442 A1 * | 7/2022 | Voglewede | E21B 10/42 |

OTHER PUBLICATIONS

Written Opinion for PCT Patent Application No. PCT/US2019/045711, mailed May 7, 2020; 6 pages.

International Search Report and Written Opinion for PCT Patent Application No. PCT/US2019/045699, mailed May 8, 2020; 13 pages.

* cited by examiner

EARTH-BORING DRILL BIT FORMED BY ADDITIVE MANUFACTURING

RELATED APPLICATIONS

This application is a U.S. National Stage Application of International Application No. PCT/US2019/045711 filed Aug. 8, 2019, which designates the United States.

TECHNICAL FIELD

The present disclosure relates generally to drilling tools, such as earth-boring drill bits.

BACKGROUND

Wellbores are most frequently formed in geological formations using earth-boring drill bits. Various types of such bits exist, but all of them experience some type of wear or fatigue from use that limits the overall life of the bit or the time it may spend downhole in the wellbore before being returned to the surface. The materials used in the bit and their ability to effectively cut different types of formations encountered as the wellbore progresses also sometimes necessitate removing the bit from the wellbore, replacing the bit or components of it, and returning the bit downhole to resume cutting.

Particularly as wellbores reach greater depths, the process of removing a bit from the wellbore and returning the bit to the surface becomes time consuming and costly. In addition, the bit and bit components themselves are costly and are time consuming to make or replace. As a result, those involved in designing, manufacturing, and operating earth-boring drill bits and their components spend a substantial amount of time developing ways to limit removal and return of a bit in a wellbore as well as ways to improve the life of the bit and its components. These efforts are complicated, however, by the fact that earth-boring drill bits and their components and operation are often quite complex, resulting in some improvements being found to be impractical to implement.

Drill bits and other downhole tools are typically formed by subtractive manufacturing, which involves removing material from a block of material. Matrix drill bits and other downhole tools, made of multiple materials, are formed by placing loose reinforcement material, typically in powder form, into a mold and infiltrating the reinforcement material with a binder material such as a copper alloy. The reinforcement material infiltrated with the binder material may form a matrix bit body after solidification of the binder material with the reinforcement material.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

The present disclosure relates to an earth-boring drill bit containing at least two different steel alloys, two different copper (Cu) alloys, two different Nickel (Ni) alloys, including two different Cu—Ni alloys, or combinations of steel alloys, Cu alloys, and Ni alloys that are deposited in separate regions of the earth-boring drill bit using additive manufacturing.

Different steel alloys are designated by different numbers for steel in the Unified Numbering System (UNS) as established by the American Iron and Steel Institute (AISI) and Society of Automotive Engineers (SAE) as of May 1, 2019. Steel alloys in the UNS include D00001 to D99999, G00001 to G99999, H00001 to H99999, K00001 to K99999, S00001 to S99999, and T00001 to T99999.

Different Cu alloys are designated by different numbers for Cu alloys in the UNS as of May 1, 2019. Cu alloy grades in the UNS include C00001 to C99999. Cu—Ni alloys are typically found in UNS C00001 to C99999.

Different Ni alloys are designated by different numbers for Ni alloys in the UNS as of May 1, 2019. Ni alloy grades in the UNS include N00001 to N99999.

Alloys disclosed herein may be two-element alloys, such as steel formed solely from iron (Fe) and carbon (C), or multi-element alloys, such as steel including Fe, C, and at least one or any combinations of the following additional elements: manganese, nickel, chromium, molybdenum, vanadium, silicon, boron, aluminum, cobalt, copper, cerium, niobium, titanium, tungsten, tin, zinc, lead, or zirconium.

Different steel alloys may also be referred to as different grades of steel, meaning they have different compositions and mechanical properties. Different Cu alloys and Ni alloys also have different compositions and mechanical properties. Alloy mechanical properties of particular interest in earth-boring drill bits include modulus of elasticity, yield strength, resilience, ductility, hardness, fracture toughness, wear resistance, corrosion resistance, and erosion resistance. In some examples, one or more of these properties may be determined by reference to the relevant American Society for Testing and Materials (ASTM) standard.

It is useful to place different alloys having different mechanical properties in different regions of an earth-boring drill bit, but conventional techniques for doing so rely on welding pre-formed alloy components to one another. This limits the precision with which different alloys grades may be placed within the bit.

Additive manufacturing may be used to place different alloys in a bit, often in precise locations. In addition, additive manufacturing may avoid some of the negative thermal effects of welding. Additive manufacturing, as described in detail herein, may be used to manufacture a three-dimensional "3D" object, such as an earth-boring drill bit, by depositing layers of material upon one another. The material deposited within a layer may vary based on location, allowing different alloys for different bit regions to be placed when their layer is placed. Additive manufacturing also readily allows for gaps in material deposited, such that fluid passageways and pockets to house other bit components may be readily formed as well. Additive manufacturing may use one technique or combinations of two or more techniques. Additive manufacturing techniques that may be used include melting in layers or spray melting using a wire or powder. By way of example, two wires formed from different alloys having different mechanical properties could be used to form a layer. Other additive manufacturing techniques can also be used, including any suitable technique that is capable of building up layers of materials to form an object.

The present disclosure and its advantages are best understood by referring to FIGS. 1 through 4, where like numbers are used to indicate like and corresponding parts.

Figure 1:
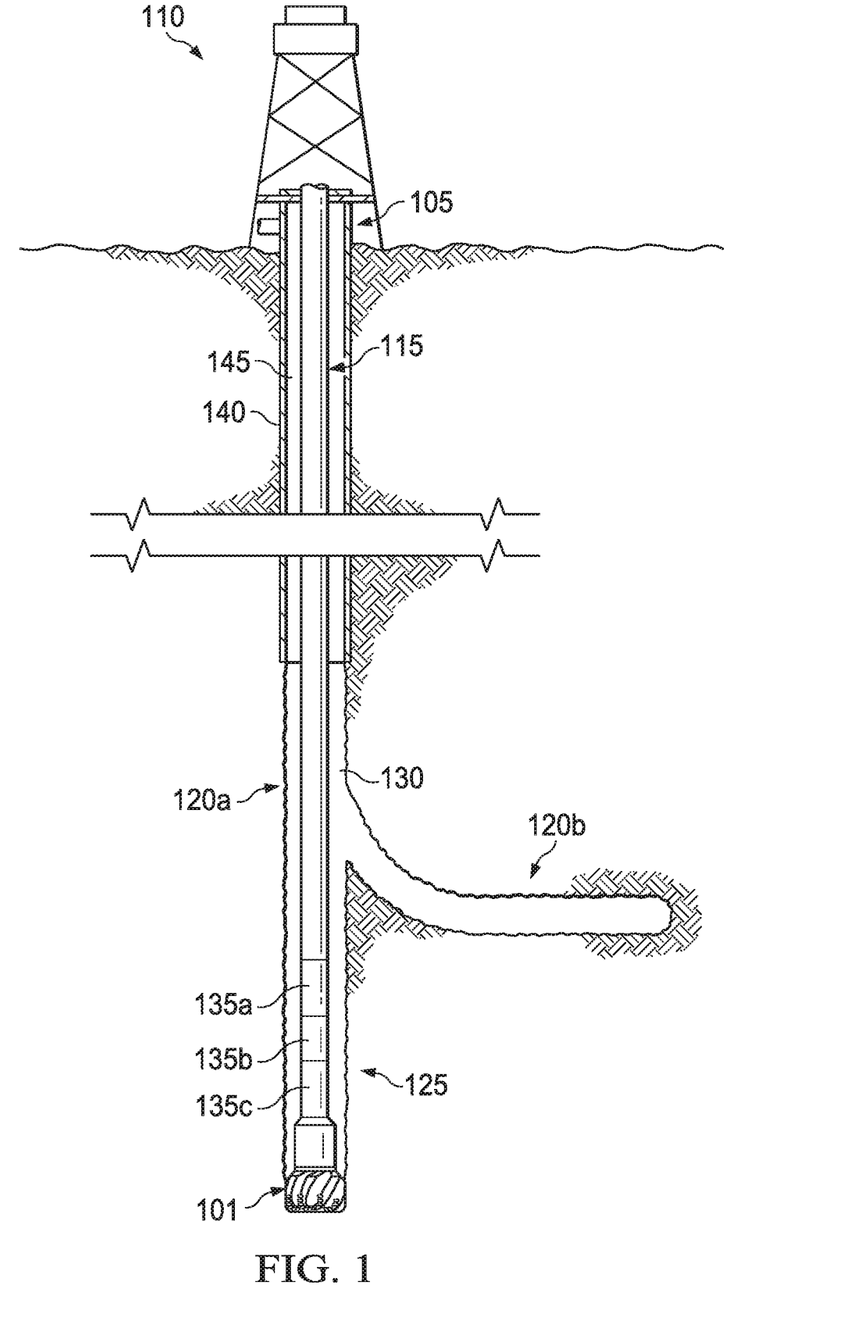
FIG. 1 is a schematic diagram of a drilling system in which an earth-boring drill bit according to the present disclosure may be used.

FIG. 1 shows a drilling system 100 including an earth-boring drill bit 101 according to the present disclosure.

Drilling system 100 may include well surface or well site 105. Various types of drilling equipment such as a rotary table, mud pumps and mud tanks (not expressly shown) may be located at a well surface or well site 105. For example, well site 105 may include drilling rig 110 that may have various characteristics and features associated with a "land drilling rig." However, drill bits according to the present disclosure may be satisfactorily used with drilling equipment located on offshore platforms, drill ships, semi-submersibles and drilling barges (not expressly shown).

Drilling system 100 may include drill string 115 associated with drill bit 101 that may be used to form a wide variety of wellbores or bore holes such as generally vertical wellbore 120a or generally horizontal wellbore 120b. Various directional drilling techniques and associated components of bottom hole assembly (BHA) 125 of drill string 115 may be used to form generally horizontal wellbore 120b. For example, lateral forces may be applied to drill bit 101 at proximate kickoff location 130 to form generally horizontal wellbore 120b extending from generally vertical wellbore 120a. A wellbore is drilled to a drilling distance, which is the distance between the well surface and the furthest extent of the wellbore, and which increases as drilling progresses. In order to maximize downhole time, drill bit 101 may be made out of certain materials. For example, the different alloys for different regions of bit 101 may be selected based on the expected downhole conditions and environment. As drill bit 101 is rotated during a drilling operation cutting elements (shown in FIG. 3 as elements 255) come into contact with the formation, in order to remove material of the formation being drilled.

BHA 125 may be formed from a wide variety of components configured to form a wellbore. For example, components 135a, 135b and 135c of BHA 125 may include, but are not limited to, drill bit, such as drill bit 101, drill collars, rotary steering tools, directional drilling tools, downhole drilling motors, reamers, hole enlargers or stabilizers. The number of components such as drill collars and different types of components 135 included in BHA 125 may depend upon anticipated downhole drilling conditions and the type of wellbore that will be formed by drill string 115 and drill bit 101.

A wellbore may be defined in part by casing string 140 that extends from well site 105 to a selected downhole location. Portions of a wellbore that do not include casing string 140 may be described as "open hole." Drilling fluid may be pumped from well site 105 through drill string 115 to drill bit 101. Such drilling fluids may be directed to flow from drill string 115 to respective nozzles (shown in FIGS. 2 and 3 as elements 245) included in earth-boring drill bit 101. The drilling fluid may be circulated back to well surface 105 through annulus 145.

Figure 2:
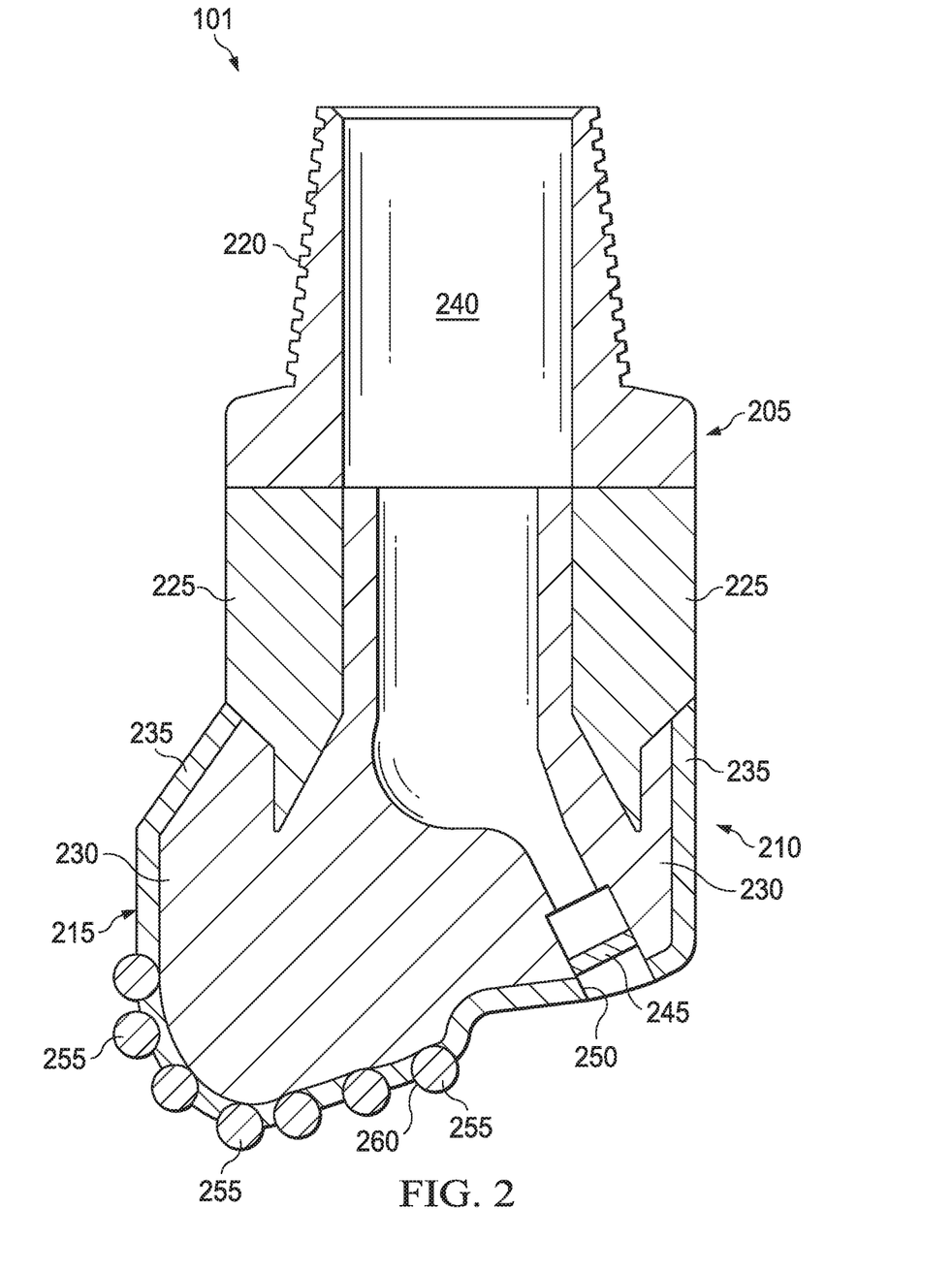
FIG. 2 is a cross-section view of an earth-boring drill bit having different alloys of metal, such earth-boring drill bit may be formed using additive manufacturing technology of the present disclosure.
Figure 3:
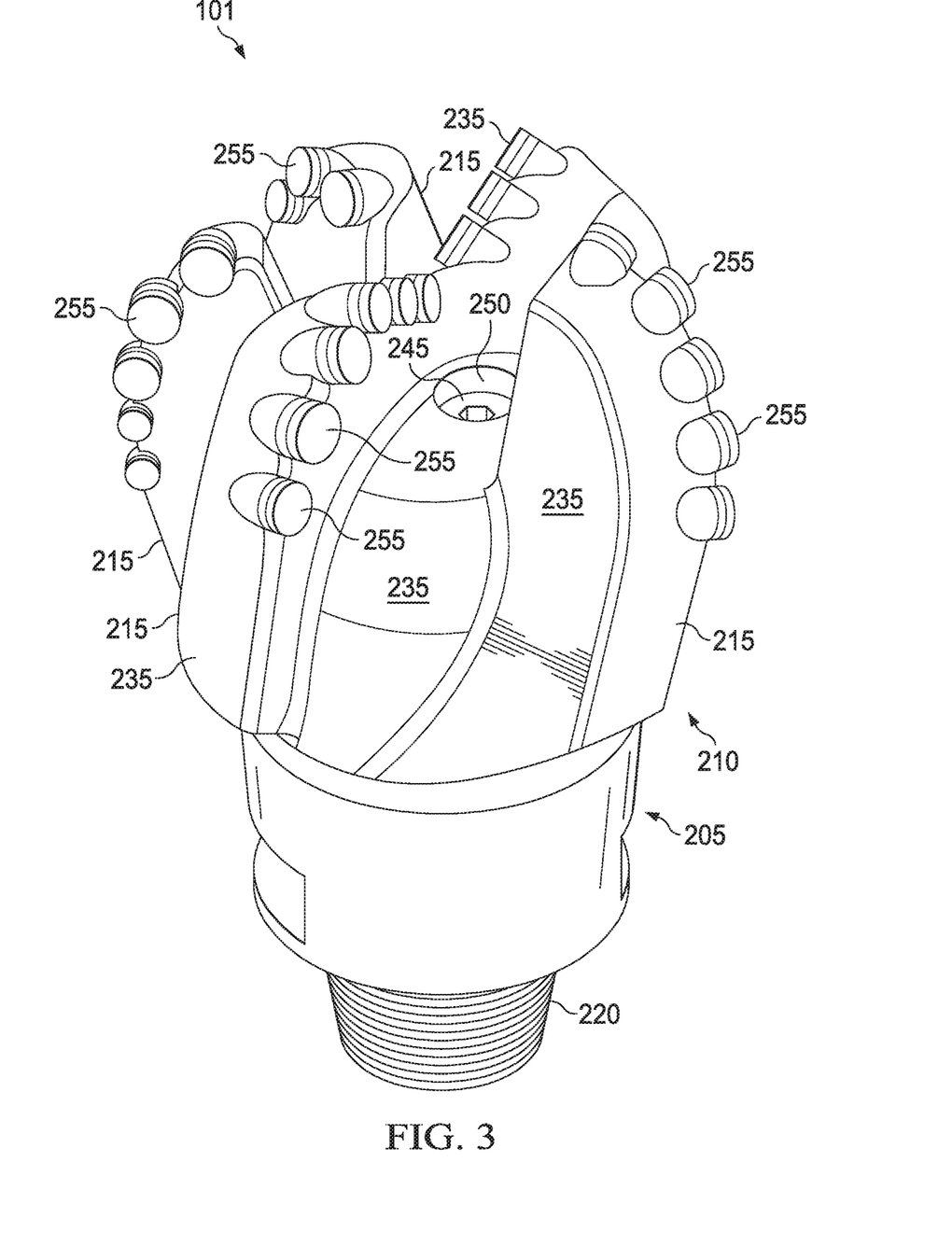
FIG. 3 is a schematic drawing showing a perspective view of the earth-boring drill bit of FIG. 2, such earth-boring drill bit may be formed using additive manufacturing technology of the present disclosure.

FIG. 2 is a cross-section view of a fixed-cutter type of earth-boring drill bit 101 and FIG. 3 is a perspective view of the same drill bit 101. Although a fixed-cutter drill bit is used throughout this specification to illustrate the principles disclosed herein, these principles may be applied, using the description provided herein, by one of ordinary skill in the art to other types of earth-boring drill bits or downhole tools that cut into a formation, such as roller cone drill bits, coring bits, and reamers.

Drill bit 101 includes at least three different regions, a shank, an internal region, and an external region, each of which may also have different sub-regions. At least two regions or sub-regions are formed from different alloys having different mechanical properties. These different mechanical properties may be selected based on the needs of the different regions. For example, during operation of drill bit 101, different regions or sub-regions of the drill bit are exposed to different forces and stresses, and thus benefit from different mechanical properties to avoid those forces and stresses damaging drill bit 101.

As illustrated in FIGS. 2 and 3, drill bit 101 includes shank 205 and bit head 210. Bit head 210, in this example, is illustrated with five blades 215. Drill bit 101 may include more or fewer blades.

Shanks, such as shank 205, are conventionally secured to bit head 210 by welding, but in drill bit 101, shank 205 may be secured to bit head 210 by directly forming bit head 210 on shank 205 using additive manufacturing. Shank 205 or a portion thereof may also be formed by additive manufacturing, which may also result in bit head 210 being attached to shank 205 without welding.

Shank 205 may include a threaded portion 220 that is able to connect drill bit 101 to drill string 115 (as illustrated in FIG. 1). Threaded portion 220 may be an American Petroleum Institute (API) connection. Shank 205 may further include a mandrel 225 which may extend into the bit head 210. Threaded portion 220, mandrel 225, or both may be formed using additive manufacturing on a metal blank.

Bit head 210 of drill bit 101 includes an internal region 230 that is secured to shank 205, typically to mandrel 225 and exterior region 235 that is secured to internal region 230 and forms the exterior of drill bit 101. At least a portion of and, in some examples, all of bit head 210 is formed by additive manufacturing. Internal region 230 and exterior region 235 are formed from different alloys by additive manufacturing. Additive manufacturing secures internal region 230 and exterior region 235 to one another. If internal region 230 is formed by additive manufacturing on shank 205 or while a portion of shank 205, such as mandrel 225 is also being formed by additive manufacturing, then the additive manufacturing secures internal region 230 to shank 205.

Drill bit 101 further includes fluid passage 240, which passes through shank 205 and bit head 210 to nozzle 245. Fluid passage 240 allows drilling fluid to pass from drill string 115 (as shown in FIG. 1) through drill bit 101, where it exits through nozzle 245 and is circulated back to well surface 105 (as shown in FIG. 1) through annulus 145 (as shown in FIG. 1). Fluid passage 240 may be formed by leaving gaps in the alloy deposited using additive manufacturing. Nozzle housing 250 and cutter pockets 260 may similarly be formed by leaving gaps in the alloy deposited using additive manufacturing. Nozzle 245 maybe secured in nozzle housing 250 after additive manufacturing is complete. Similarly, cutters 255 may be secured in cutter pockets 260 after additive manufacturing is complete. Pockets for other elements, such as depth-of-cut-control elements or erosion resistance elements may also be formed by leaving gaps in the alloy deposited using additive manufacturing, and the elements may be placed after additive manufacturing is complete. Alternatively, depth-of-cut-control or erosion resistance elements may be placed during additive manufacturing and may be secured to the drill bit 101 by the additive manufacturing process. Typically elements secured in this fashion are elements that will not be replaced or moved during the lifetime of drill bit 101.

Shank 205 or portions thereof may be formed from an alloy having a higher yield strength, a higher resilience, or both than that used to form internal region 230 or exterior region 235. The alloy used for shank 205 may further have a higher ductility. For example, if the alloy is steel, then it may be a low alloy steel having a C concentration of less than 0.3%, particularly between 0.04% and 0.3%, inclusive. The steel may be a two-component alloy or a multi-component alloy.

Internal region 230 may be formed from an alloy having a higher modulus of elasticity than that used for shank 205 or exterior region 235. For example, the modulus of elasticity may be between 29,000,000 psi and 31,000,000 psi, inclusive, between 29,500,000 psi and 30,500,000 psi, inclusive, or between 29,900,000 psi and 30,100,000 psi, inclusive. For example, if the alloy is steel, then it may be an alloy having a C concentration of between 0.4% and 0.8%, inclusive. The steel may be a two-component alloy or a multi-component alloy. For example, it may be UNS G10180.

Exterior region 235 may be erosion resistant and formed from an alloy having an equal or higher yield strength, equal or higher resilience, or both than the alloy used to form internal region 230 and a higher hardness than the alloys used to form shank 205 or internal region 230. For example, if the alloy is steel, then it may be an alloy having a C concentration of 0.6% or greater, such as between 0.6% and 1.5%, inclusive. In some steel alloys, particularly those with a C concentration that overlaps with that of alloys used for other regions of mandrel 225, erosion-resistance may be due to the presence of materials other than C, such as erosion-resistance additives, including hard particles.

Although FIGS. 2 and 3 illustrate a drill bit 101 that contains only one alloy in each of shank 205, internal region 230, and exterior region 235, the disclosure includes drill bits 101 in which one, two, or all three of shank 205, internal region 230, and exterior region are formed from at least two different alloys placed in different sub-regions. For example, thread 220 of shank 205 may be formed from a different alloy than mandrel 225.

As another example, internal region 230 may include two sub-regions, one with a harder alloy than the other. The less hard alloy may form a strain sensor. For instance, drill bit 101 may include a steel internal region 230 and a Cu—Ni alloys strain sensor. The strain sensor may be additively manufactured. Alternatively, strain sensor may be non-additively manufactured and placed in drill bit 101 after other regions of drill bit 101 are additively manufactured. Strain sensor may be located within a load path of drill bit 101. For example, if strain sensor detects an axial force, then any location in drill bit 101 is acceptable. However, if strain sensor detects torque, then it may be located close to the outer edge of drill bit 101. Drill bit 101 may further include wires or passages for wire.

In another variation, the sub-region with the harder alloy may be located around fluid passage 240 to provide greater erosion resistance to the passage, where erosion by drilling fluid is a concern.

As yet another example, exterior region 235 may include two types of sub-regions, with one type of sub-region located around cutter pockets 260, and the other in the remainder of the exterior of drill bit 101. The sub-region located around cutter pockets 260 may have a higher yield strength, higher resilience, or both to tolerate the impact transmitted through the cutters as they contact the formation.

Figure 4:
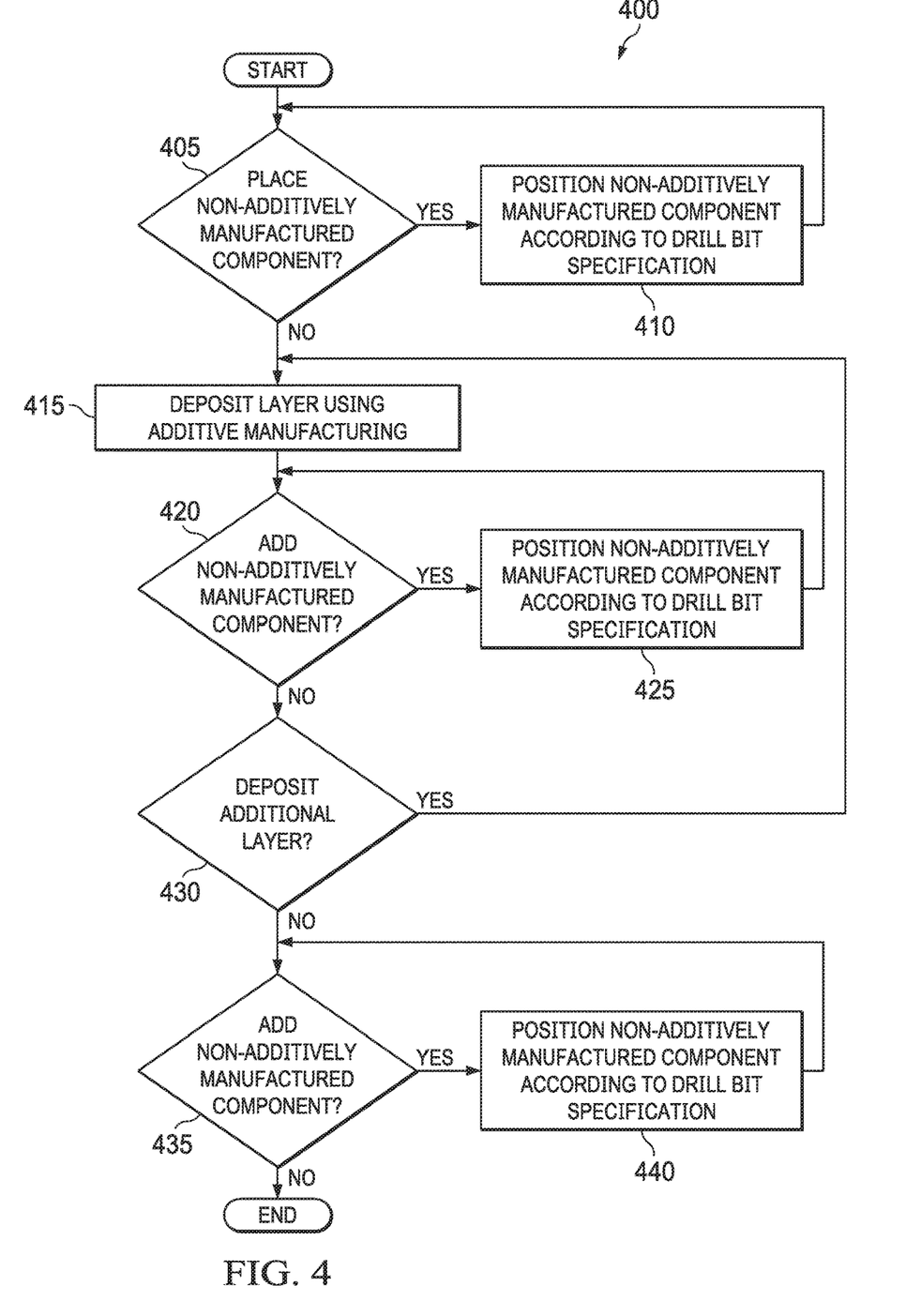
FIG. 4 is a flow chart of a method of using additive manufacturing technology to form an earth-boring drill bit having different alloys of metal, according to the present disclosure.

FIG. 4 is a flow chart of a method 400 of manufacturing an earth-boring drill bit, or a portion thereof, using additive manufacturing. The earth boring-drill bit may be any such bit as disclosed herein, including drill bit 101. The earth-boring drill bit includes different regions subjected to different mechanical forces and stresses that are formed from different alloys of steel, different Cu alloys, different Ni alloys, or combinations of steel, Cu alloys, and Ni alloys. Any alloys suitable for formation of the region using additive manufacturing may be used. In particular, alloys that may be formed into wires or particles and heated may be used.

The drill bit manufactured in method 400 is in accordance with a drill bit specification. The drill bit specification identifies regions and, if applicable, sub-regions, of the drill bit to be formed by additive manufacturing and the alloy to form each region or sub-region, as well as any gaps within the layer and the boundaries of the layer for each of the plurality of layers deposited by additive manufacturing. The drill bit specification further identifies the location of each alloy in each layer. The drill bit specification may further identify non-additively manufactured drill bit components, such as a blank or elements including high hardness or superhard materials not suitable for additive manufacturing, such as cutters, depth-of-cut-control elements, erosion resistance elements, ceramics, and electronic components, or non-additively manufactured components that will not form part of the final bit, such as an exterior shell or plastic insert to provide support during drill bit formation, and specify the location of such components and whether they are to be added to the drill bit before, during, or after a layer deposited by additive manufacturing.

In step 405, it is determined whether a non-additively manufactured component should be placed.

If such a component is not to be placed, then the method proceeds to step 415.

If such as component is to be placed, in step 410 it is positioned with respect to the additive manufacturing equipment in accordance with the drill bit specification. For example, if the drill bit includes a blank, typically a steel blank, that will form part of the shaft, then the blank is positioned such that additive manufacturing layers will be deposited in the correct locations on the blank. As another example, if the drill bit is formed with the assistance of an exterior shell, such as a shell with interior dimensions that correspond to the exterior dimensions of the drill bit or a portion thereof, the exterior shell is positioned such that additive manufacturing layers will be deposited in the correct locations in the shell. The method then returns to step 405 to determine if additional components should be placed.

In step 415, a layer is deposited using additive manufacturing according to the drill bit specification. The first layer may include only one alloy, or more than one alloy. The alloy or alloys are deposited in locations specified by the drill bit specification. If the alloy or alloys are deposited on a non-additively manufactured drill bit component, they may be secured to that component through the additive manufacturing process.

In step 420, it is determined, through reference to the drill bit specification, whether a non-additively manufactured component should be added before further layers are formed using additive manufacturing.

If a non-additively manufactured component should not be added, then the method proceeds to step 430.

If a non-additively manufactured component should be added, then in step 425 the non-additively manufactured component is positioned with respect to the layer or layers according to the drill bit specification. For example, a sensor or electronics that will be embedded in the finished drill bit may be placed prior to completion of additive manufacturing. Depth-of-cut-control and erosion resistance components may also be placed. These components may be secured in the final drill bit through the additive manufacturing process, eliminating the need for brazing or other methods of securing components. If sensitive components are placed prior to or during additive manufacturing, additive manufacturing processes and conditions may be selected so as to not damage the components, for example by high temperature. The method then returns to step 420 to determine if another non-additively manufactured component should be added.

In step 430, it is determined, through reference to the drill bit specification, whether an additional layer should be deposited using additive manufacturing.

If additional layer should not be deposited, then the method proceeds to step 435.

If an additional layer should be deposited, then the method proceeds to step 415. This process repeats until a plurality of layers have been deposited.

In step 435, it is determined, through reference to the drill bit specification, whether a non-additively manufactured component should be added to the drill bit for which additive manufacturing is complete.

If no non-additively manufactured component should be added, the method ends.

If a non-additively manufactured component should be added, then in step 440 the non-additively manufactured component is positioned in the drill bit according to the drill bit specification. For example, the non-additively manufactured component may be placed in a gap, such as a cutter pocket or nozzle housing. Then, the process returns to step 435 to determine if an additional non-additively manufactured component should be added.

A drill bit manufactured in this manner may be further modified in finishing processes. For example, threads may be formed on the shank using a lathe or mill.

Additive manufacturing used in the above method or to form any earth-boring drill bit disclosed herein may involve depositing an alloy, then treating the alloy to form a layer and secure the layer to any underlying layer or adjacent non-additively manufactured components. For example, if an alloy is deposited as a wire or powder, it may then be heated to its melting point so that the wire or powder forms a continuous layer. However, the alloy is typically not melted for a duration of time sufficient to cause it to flow into locations not specified in the drill bit specification. In addition, in layers with more than one alloy, the alloys are typically not melted for a duration of time sufficient to mix except in a very narrow boundary region, where they are adjacent to one another. For example, the alloys may not mix other than in a boundary region between 0.01 mm and 5 mm in width, inclusive.

A variety of additive manufacturing techniques may be used to form drill bits as disclosed herein. For example, additive manufacturing may include 3D printing, particularly powder bed fusion techniques such as direct metal laser sintering (DMLS), electron beam melting (EBM), selective heat sintering (SHS), selective laser melting (SLM), selective laser sintering (SLS), or fused filament fabrication (also known as fused deposition modeling and filament freeform fabrication), or any combinations thereof. A single drill bit may be formed using different additive manufacturing techniques.

Additive manufacturing used in the above method or to form any earth-boring drill bit disclosed herein may be performed using additive manufacturing equipment. This additive manufacturing equipment may include precision deposition equipment, such as a 3D printing print head, and other equipment to finish a 3D printed layer, such as heating equipment, that is controlled by a processor that is able to execute additive manufacturing instructions stored in memory communicatively coupled to the processor. The additive manufacturing instructions reflect at least the additive manufacturing portions of the drill bit specification, so that, when executed by the processor, the precision deposition equipment deposits the correct alloy in the correct form (e.g. a wire or a powder) in the correct location of the drill bit being formed, and any other equipment, such as heating equipment, finishes the layer appropriately.

The additive manufacturing instructions may themselves be produced by a processor (which may be the same processor as in the additive manufacture equipment or a different processor) that executes conversion instructions that cause it to examine the drill bit specification stored in communicatively coupled memory, which may be, for example, a computer aided drawing (CAD) file or set of files, and prepare the additive manufacture instructions so that the additive manufacturing equipment may produce a drill bit in accordance with the drill bit specification.

The additive manufacturing equipment may further include process control equipment that can, for example, scan a layer once deposited to determine if it appears to be in the correct location. This may allow drill bits with additive manufacturing errors to be detected quickly, when corrective measures are still possible, or when they can be discarded with minimal waste of material.

In an embodiment A, the present disclosure provides an earth-boring drill bit including a shank, an internal region formed from at least a first alloy using additive manufacturing and secured to the shank, and an exterior region formed from at least a second alloy using additive manufacturing and secured to the internal region using additive manufacturing. The first alloy and the second alloy have a different modulus of elasticity, yield strength, resilience, ductility, hardness, fracture toughness, wear resistance, corrosion resistance, or erosion resistance. The first alloy and the second alloy may also differ in any combinations of these properties.

In an Embodiment B, the present disclosure provides a method of manufacturing an earth-boring drill bit, such as the drill bit of Embodiment A. the method includes depositing a plurality of layers using additive manufacturing according to a drill bit specification that identifies the internal region and the external region in each layer, a location of the first alloy in each layer, a location of the second alloy in each layer, and a location of a boundary of each layer.

The disclosure also provides additional embodiments, which may be combined with Embodiment A, Embodiment B, one another, and any other parts of the disclosure contained herein unless clearly mutually exclusive. These embodiments include:

i) the first alloy may be steel, the second alloy may be steel, and the first alloy and the second alloy may have different grades;
ii) the first alloy may be steel, the second alloy may be steel, and the first alloy may have a higher yield strength, a higher resilience, or both as compared to the second alloy;
iii) the first alloy may be steel, the second alloy may be steel and the first alloy may have a higher modulus of elasticity than the second alloy;
iv) the first alloy may include iron (Fe) and carbon (C) in a C concentration of between 0.4% and 0.8%, inclusive.
v) the second alloy may include iron (Fe) and carbon (C) in a C concentration of between 0.6% and 1.5%, inclusive;
vi) the shank may be formed from at least a third alloy using additive manufacturing, and the first, second, and third alloys may have a different modulus of elasticity, yield strength, resilience, ductility, hardness, fracture toughness, wear resistance, corrosion resistance, or erosion resistance; the first alloy, second alloy, and third alloy may also differ in any combinations of these properties;
vii) the third alloy may be steel, at least one of the first alloy and the second alloy may be steel, and the first or second alloys, whichever is steel, and the third alloy may have different grades;
viii) the first alloy may be steel, the second alloy may be steel, the third alloy may be steel, and the first alloy, the second alloy, and the third alloy may all have different grades;
ix) the third alloy may be steel, at least one of the first alloy and the second alloy may be steel, and the third alloy may have a higher yield strength, a higher resilience, or both than the first alloy or the second alloy, whichever is steel;
x) the third alloy may include iron (Fe) and carbon (C) in a C concentration of between 0.04% and 0.3%, inclusive;
xi) at least one of the internal region or the exterior region may include at least two sub-regions formed from at least two sub-region alloys using additive manufacturing, and the at least two sub-region alloys may have a different modulus of elasticity, yield strength, resilience, ductility, hardness, fracture toughness, wear resistance, corrosion resistance, or erosion resistance; the sub-region alloys may also differ in any combinations of these properties;
xii) the shank may include at least two sub-regions formed from at least two sub-region alloys using additive manufacturing, and the at least two sub-region alloys may have a different modulus of elasticity, yield strength, resilience, ductility, hardness, fracture toughness, wear resistance, corrosion resistance, or erosion resistance; the sub-region alloys may also differ in any combinations of these properties;
xiii) the internal region may be secured to the shank by the additive manufacturing;
xiv) the drill bit specification may further identify a non-additively manufactured component and specify a location for the non-additively manufactured component, and the method may include placing or adding the non-additively manufactured component in the specified location;
xv) the drill bit specification may further identify a location of a gap within at least a portion of the plurality of layers;
xvi) additive manufacturing may include direct metal laser sintering (DMLS), electron beam melting (EBM), selective heat sintering (SHS), selective laser melting (SLM), selective laser sintering (SLS), or fused filament fabrication, or any combinations thereof;
xvii) additive manufacturing may include placing a wire or powder of the first alloy or the second alloy in its location in each layer;
xviii) the first alloy and the second alloy may be adjacent in the plurality of layers and mix only in a boundary region that is between 0.01 mm and 5 mm in width, inclusive.

Although the present disclosure and its advantages have been described in detail, it should be understood that various changes, substitutions and alterations can be made herein without departing from the spirit and scope of the disclosure as defined by the following claims. For example, alloys other than steel, Cu alloys, or Ni alloys, such as Chromium alloys, as designated by different UNS numbers, may be used. It is intended that the present disclosure encompasses such changes and modifications as fall within the scope of the appended claims.

What is claimed is:

1. An earth-boring drill bit comprising:
   a shank;
   an internal region formed from at least a first alloy using additive manufacturing and secured to the shank;
   an exterior region comprising a first sub-region located around cutter pockets and formed from at least a second alloy using additive manufacturing and secured to the internal region using the additive manufacturing;
   cutters disposed in the cutter pockets; and
   a strain sensor disposed near an edge of the drill bit in a load path of the first sub-region to detect torque resulting from impact transmitted through at least one of the cutters during contact with a formation,
   wherein the first alloy and the second alloy have a different modulus of elasticity, yield strength, resilience, ductility, hardness, fracture toughness, wear resistance, corrosion resistance, or erosion resistance.

2. The earth-boring drill bit of claim 1, wherein the first alloy is steel, the second alloy is steel, and the first alloy and the second alloy have different grades.

3. The earth-boring drill bit of claim 1, wherein the first alloy is steel, the second alloy is steel, and the first alloy has a higher yield strength, a higher resilience, or both as compared to the second alloy.

4. The earth-boring drill bit of claim 1, wherein the first alloy is steel, the second alloy is steel and the first alloy has a higher modulus of elasticity than the second alloy.

5. The earth-boring drill bit of claim 1, wherein the first alloy comprises iron (Fe) and carbon (C) in a C concentration of between 0.4% and 0.8%, inclusive.

6. The earth-boring drill bit of claim 1, wherein the second alloy comprises iron (Fe) and carbon (C) in a C concentration of between 0.6% and 1.5%, inclusive.

7. The earth-boring drill bit of claim 1, wherein the shank is formed from at least a third alloy using additive manufacturing, and wherein the first, second, and third alloys have a different modulus of elasticity, yield strength, resilience, ductility, hardness, fracture toughness, wear resistance, corrosion resistance, or erosion resistance.

8. The earth-boring drill bit of claim 7, wherein the third alloy is steel, at least one of the first alloy and the second alloy is steel, and the first or second alloys, whichever is steel, and the third alloy have different grades.

9. The earth-boring drill bit of claim 7, wherein the first alloy is steel, the second alloy is steel, the third alloy is steel, and the first alloy, the second alloy, and the third alloy all have different grades.

10. The earth-boring drill bit of claim 7, wherein the third alloy is steel, at least one of the first alloy and the second alloy is steel, and the third alloy has a higher yield strength, a higher resilience, or both than the first alloy or the second alloy, whichever is steel.

11. The earth-boring drill bit of claim 7, wherein the third alloy comprises iron (Fe) and carbon (C) in a C concentration of between 0.04% and 0.3%, inclusive.

12. The earth-boring drill bit of claim 7, wherein the shank comprises at least two sub-regions formed from at least two sub-region alloys using additive manufacturing, wherein the at least two sub-region alloys have a different modulus of elasticity, yield strength, resilience, ductility, hardness, fracture toughness, wear resistance, corrosion resistance, or erosion resistance.

13. The earth-boring drill bit of claim 1, wherein at least one of the internal region or the exterior region comprises at least two sub-regions formed from at least two sub-region alloys using additive manufacturing, wherein the at least two sub-region alloys have a different modulus of elasticity, yield strength, resilience, ductility, hardness, fracture toughness, wear resistance, corrosion resistance, or erosion resistance.

14. The earth-boring drill bit of claim 1, wherein the internal region is secured to the shank by the additive manufacturing.

15. The earth-boring drill bit of claim 1, wherein the shank comprises a mandrel and a threaded portion, and wherein the threaded portion is formed from a different alloy than the mandrel.

16. The earth-boring drill bit of claim 1, wherein the strain sensor comprises a non-additively-manufactured strain sensor located within the load path of the first sub-region.

17. The earth-boring drill bit of claim 1, wherein the shank, the internal region, and the exterior region are each formed from at least two different alloys.

18. The earth-boring drill bit of claim 1, wherein the internal region comprises a first sub-region and a second sub-region, wherein the first sub-region of the internal region comprises a Cu—Ni alloy strain sensor configured to detect an axial force resulting from contact of the earth-boring drill bit with the formation.

\* \* \* \* \*